United States Patent [19]
Nessler et al.

[11] 3,906,361
[45] Sept. 16, 1975

[54] DIGITAL PHASE MEASURING SYSTEM

[75] Inventors: Norbert Nessler; Dieter Fritz, both of Innsbruck, Austria

[73] Assignee: The United States of America as represented by the Secretary of the Air Force, Washington, D.C.

[22] Filed: Sept. 26, 1973

[21] Appl. No.: 401,005

[52] U.S. Cl............................................ 324/83 D
[51] Int. Cl.²................................... G01R 25/00
[58] Field of Search .......... 324/83 D; 307/290, 261

[56] References Cited
UNITED STATES PATENTS
3,209,254  9/1965  Hossmann......................... 324/83 D
3,621,452  11/1971  Ho..................................... 307/290

OTHER PUBLICATIONS
Brophy; Electronics for Scientists; pp. 371–372; McGraw-Hill, 1966.
Moore; IBM Tech. Discl. Bul., July 1960, pp. 35.
Bombi et al., Elec. Engr.; Feb. 1971, pp. 55–58.

*Primary Examiner*—Stanley T. Krawczewicz
*Attorney, Agent, or Firm*—Joseph E. Rusz; Julian L. Siegel

[57] ABSTRACT

A system for measuring the phase difference between two signals and having a digital readout. Each of the two signals are fed to Schmitt trigger circuits which convert the sine wave signals to square waves. The two square waves are compared for coincidence in a discriminator, the output thereof being converted by a logic circuit to a form for displaying the digital phase difference of the two signals.

3 Claims, 17 Drawing Figures

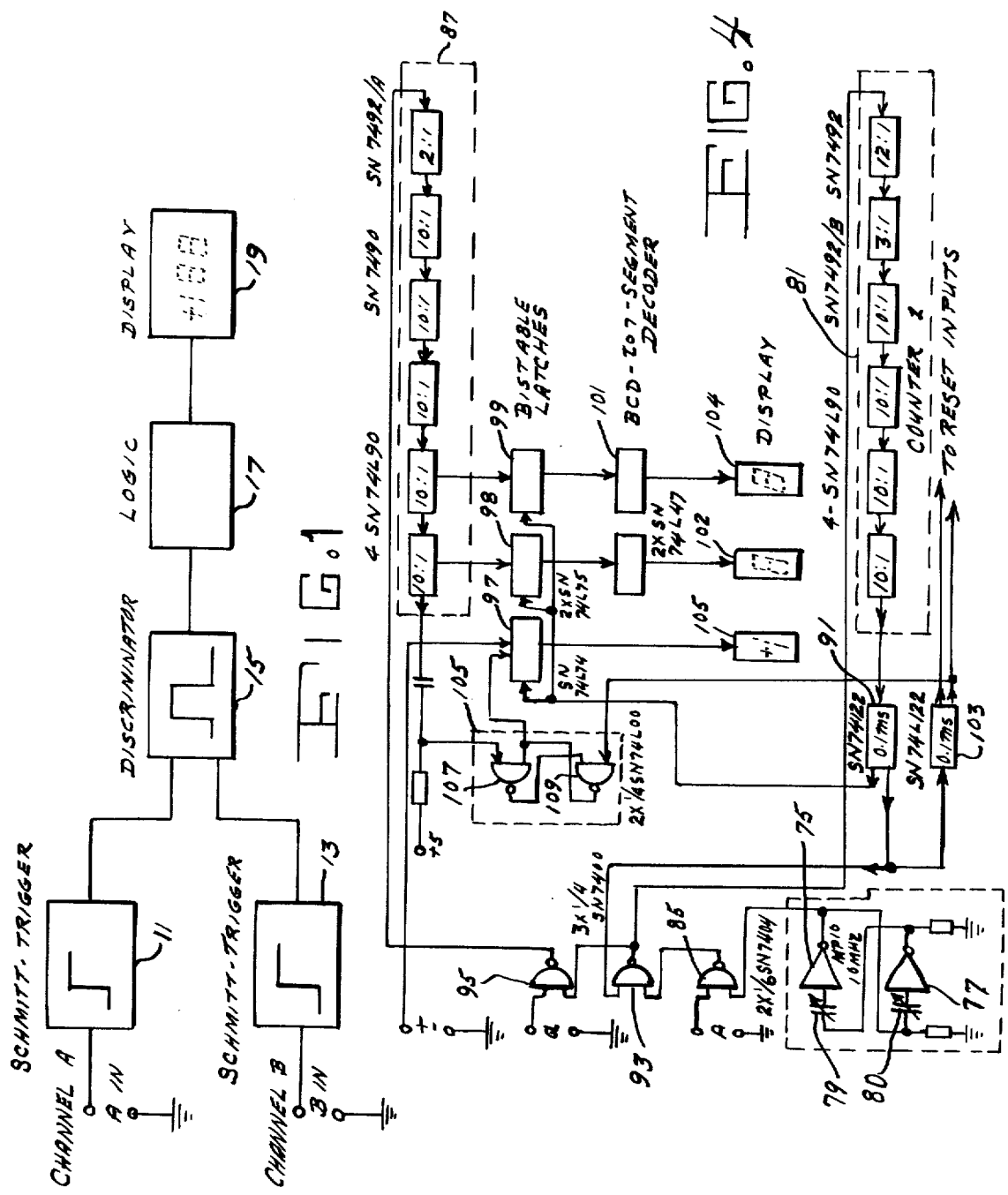

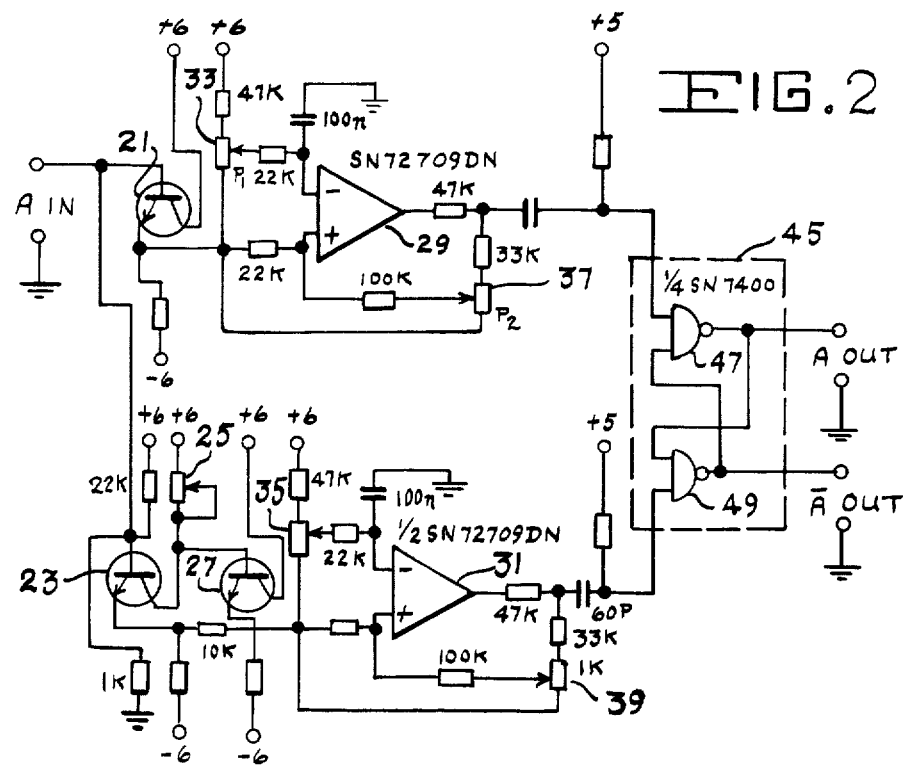
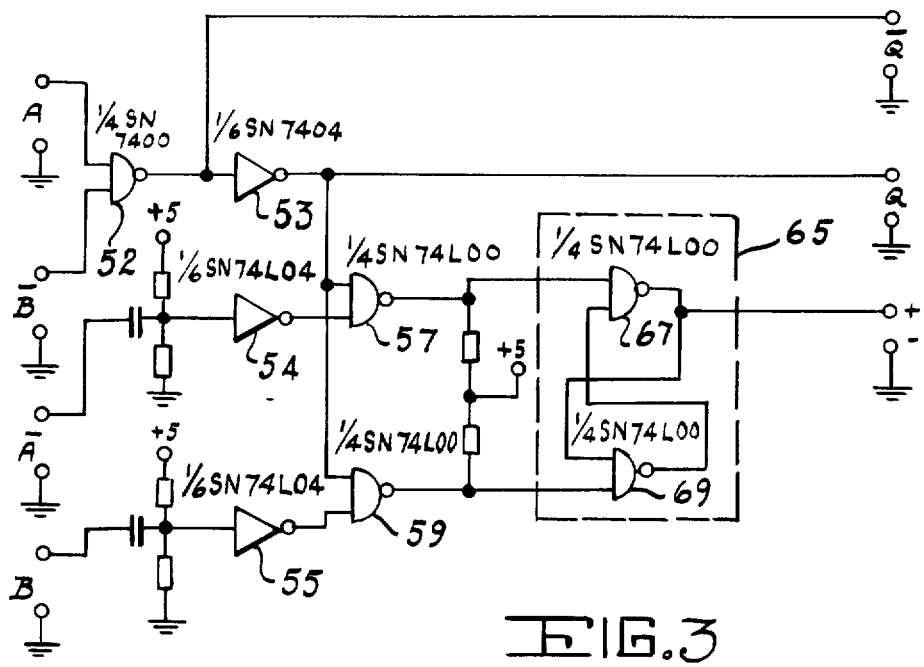

DIGITAL PHASE MEASURING SYSTEM

BACKGROUND OF THE INVENTION

This invention relates to systems for comparing pairs of signals, and more particularly to a digital phase measuring device.

There is a need in the art for a phase measuring device comparing two incoming signals (such as a measuring signal and a reference signal) that is independent of frequency and amplitude. The present invention supplies that need by providing a system for indicating the phase differences of the two signals with a digital readout and is independent of amplitude and frequency over a wide range, using a solid state 7-segment display indicating from −180° to +180°.

SUMMARY OF THE INVENTION

The present invention measures the mutual phase position of two signals with particular adaptation to VLF and LF waves. The phase is indicated digitally and is independent of the amplitude and frequency between the range of >0 Hz and 100 kHz.

It is therefore an object of the invention to provide a system for measuring phase differences between two signals with a digital readout.

It is another object to provide a digital phase measurement system independent of the amplitude of the two signals being compared.

It is another object to provide a digital phase measurement system independent of frequency between a wide range.

These and other objects, features and advantages of the invention will become more apparent from the following description taken in connection with the illustrated embodiment of the accompanying drawings.

DESCRIPTION OF THE DRAWINGS

FIG. 1 is a block diagram showing the basic embodiment of the invention;

FIG. 2 is a circuit diagram showing the details of one of the Schmitt trigger channels shown in FIG. 1;

FIG. 3 is a circuit diagram showing the detail of the discriminator shown in FIG. 1;

FIG. 4 is a block diagram showing the detail of the display logic shown in FIG. 1.

DETAILED DESCRIPTION OF THE PREFERRED EMBODIMENT

Figure 5:
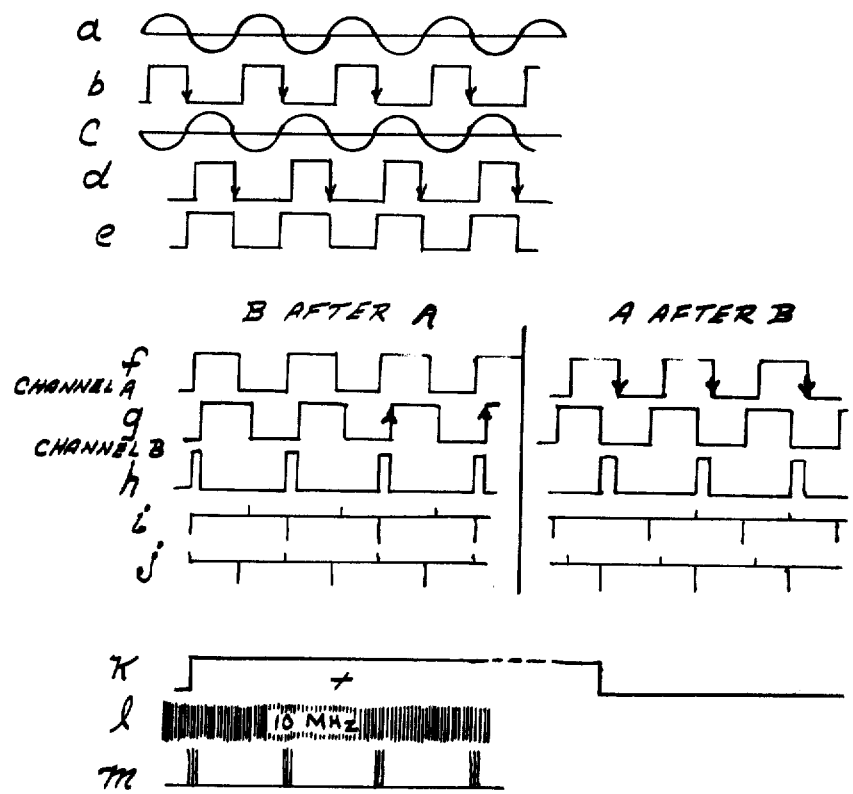
FIGS. 5a–5m are waveform diagrams useful in the explanation of the invention.

Referring to FIG. 1, the basic block diagram of the system is shown but without the receiving antennas and preamplifiers which are well known and conventional. The present invention utilizes a pair of means for converting a sine wave into a square wave which is a function of a Schmitt trigger circuit. These converting means are Schmitt trigger type circuits even though the customary Schmitt trigger circuits are not used. Consequently, hereinafter whenever the term "Schmitt trigger" is used, it is understood that the term refers to a means for converting a sine wave to a square wave. The two received signals in which the relative phase position is to be measured are fed to inputs A and B. Two Schmitt trigger units 11 and 13 transform the input signals which are in the form of sine waves into square wave signals with a preferable pulse duty factor of 1:2. The two square wave signals are compared to determine their coincidence in discriminator 15. The pulse duration of the output signal at discriminator 15 is a direct measure for the phase shift. Logic circuit 17 produces a different phase proportional signal which uses a counting oscillator preferably at 10 MHz to count the pulses. This number of pulses within a definite time is a direct measure of the phase angle independent of input amplitude and input frequency and is indicated at 7-segment display 19.

Referring to FIG. 2, there is shown the circuit for one of the Schmitt trigger channels in which the sine wave signal is fed to input A. In the upper branch of this circuit transistor 21 is an impedance transformer and is connected to one-half of the Schmitt trigger. In the lower branch the sine wave signal is inverted by transistor 23 and the gain of this transistor is set to 1 by potentiometer 25. The succeeding transistor 27 is an emitter follower and controls the second half of the Schmitt trigger. These half-Schmitt triggers include amplifiers 29 and 31 which can be 709 operational amplifiers and they operate on the positive half of the sine wave. The minimum input voltages may be adjusted with potentiometers 33 and 35 and the hysteresis by potentiometers 37 and 39. This circuit operates in such a manner that the Schmitt trigger is independent of amplitude and always switches off the zero passage of the sine signal (see the pulse diagram, FIGS. 5a and 5b). To obtain extremely steep square angle edges the operational amplifiers are operated without frequency compensation. Inverting the sine signal in the lower branch causes the Schmitt trigger to switch off exactly at the other zero passage of the sine wave signal (FIGS. 5c and 5d). The outputs of both Schmitt triggers produce square wave signals, the negative slopes of which fall exactly together with the zero passages of the sine signals. The negative slopes of the two square wave signals switch flip-flop 45 including gates 47 and 49, the output thereof having a rectangular shape with a pulse duty cycle of 1 to 2 (FIG. 5e) which corresponds to a null hysteresis. If a preamplifier were used for the purpose of this effect atmospheric noise would have to be considered as well as in the case of a lack of actual signal. In the limit case the pulse duty factor would be no longer 1:2, consequently the double channel system is necessary.

The phase signal is generated in the discriminator which is shown in FIG. 3. Table 1 describes the required function.

TABLE 1

| A | O | L | O | L |
|---|---|---|---|---|
| B | O | O | L | L |
| B̄ | L | L | O | O |
| Q | O | L | O | O |

It can be seen that Q becomes a logic L when the signal A is equal to logic L nd signal B is equal to logic 0, which means that the length of the output of signal Q is directly proportional to A and B (FIGS. 5f – 5h). Mathematically this logic interconnection is described by the equation $Q = A \times \bar{B}$ and is realized by NAND gate 52 followed by inverting amplifier 53. This circuit also distinguishes whether A arrives before B or vice versa so that the phase can be indicated in the range between +180° or −180°. If signal A arrives before signal B which is a positive phase shift, the rising slopes of these signals produce signal Q. The falling slope produces signal Q when both arrive before A which is a negative phase shift (FIGS. 5i through 5k). The slopes of the signals A and B as shown in the lower portion of FIG. 3 are differentiated and tested for coincidence by means of the phase signal Q and NAND gates 57 and 59 preceded by inverting amplifiers 54 and 55. Subsequently flip-flop 65 including gates 67 and 69 is set which indicates a logic L at the positive phase shift and a logic 0 at the negative phase shift.

The logic which uses a 7-segment display is shown in FIG. 4. A square wave signal preferably of 10 MHz (FIG. 5l) is produced by square wave generator 73 including two inverters 75 and 77 and using capacitor trimmers 79 and 80. In counter 81 every 360,000 cycles of this 10 MHz signal is counted forming one counting cycle. Counter 87 receives counting pulses only as long as Q is equal to L at the output of the discriminator and fed at NAND gate 95 (see FIG. 5m). The counting cycle is interrupted by means of NAND gate 85 when the input voltage at channel A becomes small enough to eliminate the input of the Schmitt trigger. This interruption is necessary when the input signal becomes discontinuous as is the case with keyed transmitters. Counter 87 can reach a maximum of 360,000 since counters 81 and 87 only operate when A = L (the pulse duty factor of A is 1 : 2). After dividing this number by 2 and cancelling the last three decimal places the contents of the counter correspond to the phase shift measured in angular degrees. The end of one counting cycle sets monostable multivibrator 91 to a logical L which blocks the 10 MHz clock pulse at NAND gate 93 and at the same time bistable latches 97–99 are switched on. The last two decimal places of counter 87 are fed through bistable latches 98 and 99 and then decoders 100 and 101 which convert a binary coded decimal to a form of 7 -segment indication. These decoders are fed to 7-segment 7-segment displays 102 and 104. Bistable latch 97 feeds indicator 105 directly. The falling slope of multivibrator 91 switches a second monostable multivibrator 103 to the quasistable position. Consequently all counters and flip-flop 105 for the carryover which include NAND gates 107 and 109 are zeroed and a new counter cycle can start.

What is claimed is:

1. A system for measuring the phase difference between two input signals comprising:
   a. first and second Schmitt trigger channels fed by one each of the two input signals for converting said signals into square waves wherein the first and second Schmitt trigger channels have null hysteresis and each channel includes:
      1. an inverting transistor fed by one input signal,
      2. first and second impedance transforming transistors fed by respectively the input signal and the inverting transistor,
      3. first and second Schmitt trigger operational amplifiers fed respectively by the first and second impedance transforming transistors, and
      4. a first flip-flop fed by the first and second operational amplifiers and having first and second complementary output states;
   b. a discriminator fed by the square wave outputs of the first and second Schmitt triggers for determining the coincidence thereof and producing a signal proportional to the phase difference of the two input signals;
   c. logic means including a counting oscillator for converting the length of the phase proportional signal from the discriminator to a digital signal; and
   d. a display fed by the logic means.

2. A phase measuring system according to claim 1 wherein the discriminator comprises:
   a. a first NAND gate fed by the first output state of the first Schmitt trigger channel and the second output state of the second Schmitt trigger channel, the output being a first phase signal;
   b. a first inverting amplifier fed by the first NAND gate, the output being a second phase signal and complementary to the first phase signal;
   c. a second inverting amplifier fed by the second output of the first Schmitt trigger channel;
   d. a second NAND gate fed by the first and second inverting amplifiers;
   e. a third inverting amplifier fed by the first output state of the second Schmitt trigger channel;
   f. a third NAND gate fed by the first and third inverting amplifiers; and
   g. a second flip-flop fed by the second and third NAND gate and having an output indicating phase shift direction.

3. A phase measuring system according to claim 2 wherein the counting oscillator of the logic means is a square wave generator and said logic means further includes:
   a. a fourth NAND gate fed by the square wave generator and the first output of the first Schmitt trigger channel;
   b. a fifth NAND gate fed by the fourth NAND gate;
   c. a first means for counting a predetermined number of pulses including a sequence of frequency divider stages, the first counting means being fed by the fifth NAND gate;
   d. a first monostable multivibrator fed by the first counting means and generating a second input to the fifth NAND gate;
   e. a second monostable multivibrator fed by the first monostable multivibrator;
   f. a sixth NAND gate fed by the fifth NAND gate and the first inverting amplifier from the discriminator;
   g. a second means for counting a predetermined number of pulses including a sequence of frequency divider stages fed by the sixth NAND gate;
   h. a third flip-flop fed by the second counting means and the second monostable multivibrator;
   i. a first bistable latch circuit fed by the second flip-flop from the discriminator, the third flip-flop, and the first monostable multivibrator;
   j. second and third bistable latch circuits fed by one each of the last two of the sequence of frequency divider stages of the second counting means and by the first monostable multivibrator;
   k. first and second decoder means for converting binary coded decimals to 7-segment indications; and
   l. means for displaying the outputs of the first bistable latch circuit and the first and second decoding means.

* * * * *